Dec. 10, 1935. S. M. WOOD Re. 19,786
JETTY
Original Filed Aug. 20, 1932
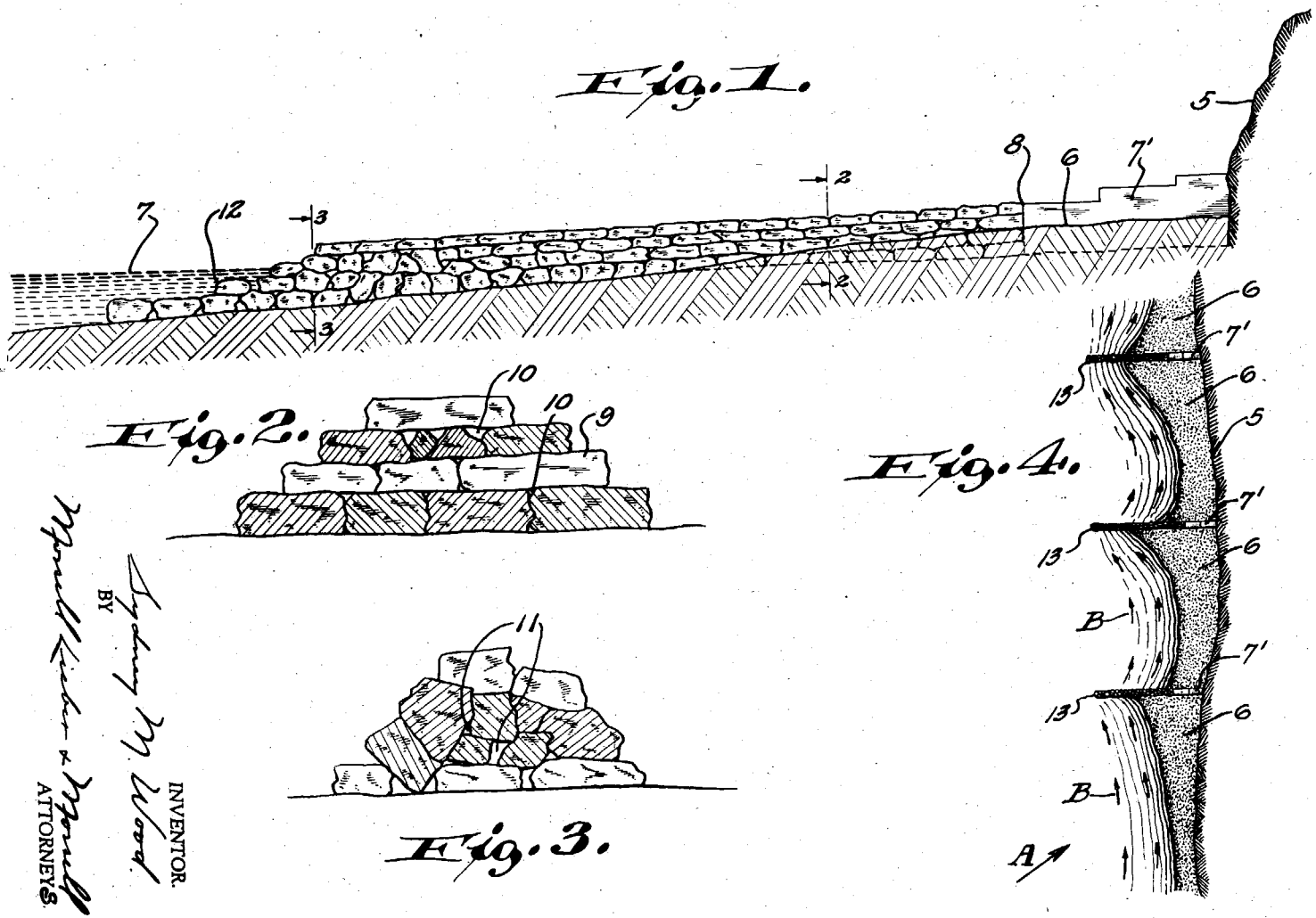
INVENTOR.
Sydney M. Wood.
BY
Morsell Lieber & Morsell
ATTORNEYS.

Reissued Dec. 10, 1935

Re. 19,786

UNITED STATES PATENT OFFICE 19,786

JETTY

Sydney M. Wood, Lake Bluff, Ill.

Original No. 1,923,473, dated September 26, 1933, Serial No. 629,565, August 20, 1932. Application for reissue September 7, 1935, Serial No. 39,661

9 Claims. (Cl. 61—4)

This invention relates to improvements in jetty.

The problem of protecting lake front property is one which has presented innumerable difficulties. On the shores of the Great Lakes, landslides have occurred from time to time causing the destruction of thousands of dollars worth of property. The major cause of these landslides, in most sections, is the accumulation of seepage water underneath the ground. This seepage water, which is constantly flowing toward a natural outlet in the lake, often meets obstructions, and collects for a period of time until the weight of the accumulation overcomes the obstruction. The water will then burst through the hillside carrying a large amount of soil with it, and causing a cave in of soil above. The only effective way of controlling the seeping water is through a suitable drainage system.

There is, however, another important factor which contributes with the seepage water in causing a receding shore line, and that is the erosive action of the lake's forces. Necessarily, this erosive action is most damaging during a period when the lake level is high, and in view of the fact that statistics show that high levels occur in regular cycles, there is always a period of transition between a low level and a high level during which most property owners are inadequately protected.

Heretofore, it has been attempted to check this erosive action by building retaining walls which parallel the edge of the hillside. There is, however, no wall strong enough to permanently withstand the action of the lake's forces, and this type of protection is therefore efficacious for a short time only. A long, gradually sloping beach well supplied with sand and gravel, is the best protection against erosive action, as it has the ability to rob a storm of its destructive power, and it is to the formation of a beach of this type that this invention particularly relates.

The principal forces causing erosion on a lake shore are contributed to by the air and by the water itself, and the two movements set up by the air are wave action and littoral currents. With a wind blowing directly at right angles to the shore, denudation of the beach takes place, as there is a surface drift shoreward and an undertow lakeward, which, assisted by the fact that the waves stir up sediment, is able to convey material from the short out to deeper water.

The most common condition is when the wind is blowing at an oblique angle to the short, and when this is the case the sand and other particles held in suspension in the water are caused to travel along the shore line. With this fact in mind, it may be seen that the particles can be accumulated by the construction of an obstacle across their path, that is, by the construction of a jetty or groin extending into the lake at right angles to the bank. The formation of a suitable type of protective beach by this method, however, cannot be accomplished with the ordinary type of groin, as it is found that while deposits may form on the storm side of the jetty, they will tend to concentrate to provide a relatively steep slope adjacent the jetty on this side, and on the lee side objectionable scouring will take place. It is also found that with most types of jetties, scouring will take place at the outer end of the jetty due to the accelerated velocity of the littoral currents around said end.

It is, therefore, one of the objects of the present invention to provide an improved method of forming protective beaches which results in the formation of a long, gradually sloping beach on both sides of the jetty, and in the elimination of scouring action at the outer end.

A further object of the invention is to provide an improved jetty for effecting commercial exploitation of the above method.

Other objects of the invention are to provide a jetty which greatly accelerates the deposit of beach building material, which nullifies the wave action and reduces the energy of littoral currents, and which causes the deposit of a greater percentage of fine sand.

A further object of the invention is to provide a jetty adapted to produce a beach which is advantageous, not only in that it protects the shore line, but also in that it renders the shore unusually suitable for bathing purposes.

With the above and other objects in view, the invention consists of the art of forming protective beaches, and all its parts and combinations as set forth in the claims, and all equivalents thereof.

In the accompanying drawing illustrating one complete embodiment of the preferred form of the invention, in which the same reference numerals designate the same parts in all of the views:

Fig. 1 is a side elevational view of the improved jetty;

Fig. 2 is an enlarged cross sectional view taken on line 2—2 of Fig. 1;

Fig. 3 is an enlarged cross sectional view taken on line 3—3 of Fig. 1; and

Fig. 4 is a plan view on a reduced scale of a lake shore showing a plurality of parallel jetties installed.

Referring more particularly to the drawing, the numeral 5 designates a hillside leading down to a beach bordering a lake. In cases where there is an artificial barrier such as a retaining wall paralleling a hillside, the jetty will be laid in the same relation with respect thereto as it is with respect to the hillside 5. The numeral 6 designates the sand beach, and the numeral 7 the water level of the lake.

With the present invention, in order to obstruct the littoral currents to cause the deposit of particles of sand in proper formation to provide a long, gradually sloping beach, one or more jetties must be extended from the hillside or wall 5 outwardly into the lake at approximately right angles to the hillside. In view of the fact that permeability is unimportant on the portion of the beach close to the hillside which is not reached by the water of the lake, it is preferred to construct the first section of the jetty of concrete or other impermeable material, as at 7'. At the outer end 8 of the section 7', the construction is continued by the use of a rock fill or other fill composed of individual elements. These rocks are preferably approximately rectangular in shape and are preferably laid in the manner indicated by cross section in Fig. 2 to provide a jetty with sloping sides 9. The rocks are also so laid that there is a permeability in the wall of approximately 30 per cent produced by spaces 10 formed between adjacent corners of the rocks. In the portion of the wall adjacent the section line 2—2 of Fig. 1, the rocks are preferably laid with a certain degree of regularity in the manner shown in Fig. 2. As the jetty extends outwardly into the lake, however, it is very advantageous to increase the permeability, and this feature is one of extreme importance in the present invention. This increase in permeability is accomplished by laying the rocks in less regular formation, as the jetty extends outwardly as indicated in Fig. 3, wherein it may be seen that the rocks are less regular in form and are laid in a more haphazard manner to compel the water to pass in an indirect or tortuous course through the wall and to provide larger spaces 11 between the individual rocks for the purpose of increasing the permeability.

It may be seen that the major portion of the length of the jetty projects above the water line. At the outer end, however, it is desirable to have a partial submergence below the water level, as indicated at 12. This is for the purpose of allowing the shore currents to pass at reduced speeds through and over the submerged ends, and to cause the retardation of currents passing inward or outward along the sides of prevent scouring at the end and along the sides.

It is found that the character of the beach may be still further improved by laying a plurality of jetties of the type described in connection with Fig. 1, in parallel relation to one another and spaced apart a substantial distance, as indicated in Fig. 4, wherein the jetties are designated generally by the numeral 13.

Where a solid or impermeable jetty has been used, the littoral currents carrying the sand and other fine particles in suspension are obstructed by the sides of the jetty, but the velocity of the currents is accelerated to cause a rather abrupt turning of the flow of the littoral currents from a direction parallel to the shore line to a direction parallel to the sides of the jetty, the currents therefore flowing around the end of the jetty with accelerated velocity. When the littoral currents strike the sides of an impermeable jetty, there is likely to be a momentary and rather abrupt change in the direction of travel of the currents which causes a deposit in a rather abrupt manner close to the windward side of the jetty, and inasmuch as this deposit will be concentrated adjacent the jetty, any beach developed will have an abrupt slope and will not be desirable. Furthermore, due to the accelerated velocity of the littoral currents as they move around the end of the impermeable jetty, the fine sands are carried with the current, and the majority of the fill adjacent the jetty will be of coarser material. In addition, the action of the currents around the end of an impermeable jetty wherein the velocity is greatly accelerated will cause a marked scouring to take place at the outer end of the jetty, and thereby develop a deep water spot objectionable for bathing purposes.

With the present invention, it is to be noted that the major portion of the length of the jetty is permeable, and as a result, while the littoral currents are obstructed in a manner to cause the deposit of sand and other material held in suspension, nevertheless, due to the permeable nature of the wall, the water can flow through the spaces 10 and 11 so that there is not the tendency for the currents to move in a direction parallel to the jetty and travel around the outer end with accelerated velocity such as is the case with the jetty of the impermeable type. Thus scouring at the outer end is eliminated. Furthermore, due to the fact that the currents are slowed down in a uniform manner by the permeable jetty and can trickle through an even deposit of fine material is encouraged on both sides of the jetty, and this deposit will gradually build up, not only directly adjacent the sides, but for a substantial distance laterally therefrom to cause the formation of a long, gradually sloping beach composed of fine particles of sand. With the impermeable type of jetty, the littoral currents which rush around the outer end and there cause scouring and which then move inwardly toward the shore on the other side of the jetty, will cause a scouring on the lee side.

With the permeable type of jetty wherein the permeability gradually increases from the inner end to the outer end, and wherein the outer end is also partially submerged, the passing of the water through the jetty is increasingly encouraged toward the outer end to eliminate causing movement of the currents around the end of the jetty with accelerated velocity and thereby eliminate the objectionable scouring at the outer end and on the lee side.

By referring to Fig. 4, it will be seen that with applicant's type of jetty 13, that when the wind is traveling in an oblique direction toward the shore, as indicated by the arrow A, the littoral currents indicated by the arrows B will flow somewhat in the manner indicated, that is, approximately parallel to the shore. As said currents strike the permeable jetty, instead of changing direction and traveling at right angles to the sides of the jetty and around the outer end at accelerated velocity, they will pass through the permeable jetty and there will only be a slight tendency to direct the currents outwardly. The currents will then continue as indicated, passing approximately parallel to the shore between each pair of jetties and through the next successive jetty. The result will be a gradual slowing down of the littoral currents to cause a gradual deposit of sand and the formation of an ever widening beach composed of fine material, as indicated by the numeral 6 wherein the angle of the beach is relatively flat, and wherein the tendency for the beach to concentrate directly adjacent the sides of the jetty is minimized.

It will further be seen that with the present invention, the area of new land formed will be much greater per foot of jetty than would occur with an ordinary type of construction, and that the sloped sides of the jetty shown in the cross sections tends to nullify wave action and to reduce the energy of the littoral currents.

Although only one form of the invention has been shown and described, it is to be understood that various changes and modifications may be made, and that all of such changes are contemplated as may come within the scope of the claims.

What I claim is:

1. A jetty comprising an elongated wall of rock extending outwardly at an angle to the shore, said rock being laid in relatively loose formation to render the jetty permeable.

2. A jetty comprising an elongated wall of rock extending outwardly at an angle to the shore, said rock being so laid as to render the jetty increasingly permeable outwardly.

3. A jetty comprising an elongated wall of rock extending outwardly at an angle to the shore, said rock being laid to provide sloping sides and in relatively loose formation to render the jetty permeable.

4. A jetty for use on a lake shore bordered by a hillside or the like, comprising an elongated wall extending from adjacent said hillside outwardly into the water a substantial distance at an angle to said hillside, the portion of said wall extending into the water being formed of rock laid in relatively loose formation to render the wall permeable.

5. A jetty for use on a lake shore bordered by a hillside or the like, comprising an elongated wall extending from adjacent said hillside outwardly into the water a substantial distance at an angle to said hillside, the portion of said wall extending into the water being formed of rock laid in relatively loose formation to render the wall permeable, the major portion of said wall being above the water level, and the extreme outer end being submerged.

6. A jetty comprising an elongated wall extending outwardly at an angle to the shore, said wall having outwardly increasing permeability to partially obstruct littoral currents and thereby cause a gradual decrease in the velocity of said currents and the deposit of beach building material.

7. A jetty comprising an elongated wall extending outwardly at an angle to the shore, said wall being formed of individual elements positioned relative to one another with increasing looseness outwardly to provide for outwardly increasing permeability, and said elements being laid to provide a wall having substantial width wherein the water passes in an indirect course in traveling through the wall to partially obstruct littoral currents and thereby cause a gradual decrease in the velocity of said currents and the deposit of beach building material.

8. A jetty comprising an elongated wall extending outwardly at an angle to the shore, said wall being formed of superimposed contacting rows of elements loosely positioned relative to one another to provide water passages through the wall and thereby render the jetty permeable, and the elements being further so positioned relative to one another as to provide a wall having substantial width wherein the water passes in an indirect course in traveling through the wall to partially obstruct littoral currents and thereby cause a gradual decrease in the velocity of said currents and the deposit of beach building material.

9. A jetty comprising an elongated wall extending outwardly at an angle to the shore, said wall being formed of superimposed rows of elements positioned with increasing looseness outwardly to provide for outwardly increasing permeability, and said elements being laid to provide a wall having substantial width wherein the water passes in an indirect, tortuous course in traveling through the wall to partially obstruct littoral currents and thereby cause a gradual decrease in the velocity of said currents and the deposit of beach building material.

SYDNEY M. WOOD.